United States Patent [19]

Miller et al.

[11] Patent Number: 5,124,390
[45] Date of Patent: Jun. 23, 1992

[54] CALCIUM SULFATE AS A PARTIAL REPLACEMENT FOR TITANIUM DIOXIDE IN WHITE COMPOUNDS

[75] Inventors: Steven J. Miller, Kent; Robert L. Culp, Jr., Akron, both of Ohio

[73] Assignee: The Uniroyal Goodrich Tire Company, Akron, Ohio

[21] Appl. No.: 559,459

[22] Filed: Jul. 24, 1990

Related U.S. Application Data

[63] Continuation of Ser. No. 398,595, Aug. 25, 1989, abandoned.

[51] Int. Cl.$^5$ ................................................ C08K 3/22
[52] U.S. Cl. ..................... 524/413; 524/423; 152/524; 152/DIG. 12
[58] Field of Search ............... 524/413, 423; 152/524, 152/DIG. 12

[56] References Cited

U.S. PATENT DOCUMENTS

| | | | |
|---|---|---|---|
| 3,392,139 | 7/1968 | Dingman | 430/106 |
| 3,873,321 | 3/1975 | Tatusta et al. | 430/536 |
| 4,195,996 | 4/1980 | Nakajima et al. | 430/380 |
| 4,425,452 | 1/1984 | Nakata et al. | 524/47 |
| 4,684,420 | 8/1987 | Bryant et al. | 156/116 |
| 4,911,218 | 3/1990 | Patitsas | 152/525 |

OTHER PUBLICATIONS

Hawley, Condensed Chemical Dictionary 1987, p. 209 CaSO$_4$ Definition; p. 1109 TiO$_2$ Def.
Hawley, Condensed Chemical Dictionary 1987, p. 209 CaSO$_4$ Def.; p. 1159 TiO$_2$ Def.

*Primary Examiner*—Paul R. Michl
*Assistant Examiner*—John J. Guarriello
*Attorney, Agent, or Firm*—Daniel J. Hudak; Laura F. Shunk; Alan A. Csontos

[57] ABSTRACT

The invention relates to a whitened polymeric blend composition in which the whiteness is achieved by the substitution of from about 0 to about 20 parts per hundred rubber of calcium sulfate for from about 0 to about 20 parts per hundred rubber of titanium dioxide by volume. The invention allows for a reduction of up to 20 percent of the titanium dioxide, while maintaining a brightness of at least 85 as measured on the L scale of the Minolta Chroma Meter test.

4 Claims, No Drawings

CALCIUM SULFATE AS A PARTIAL REPLACEMENT FOR TITANIUM DIOXIDE IN WHITE COMPOUNDS

This application is a continuation of application Ser. No. 07/398,595, filed on Aug. 25, 1989, bu Steven John Miller and Robert L. Culp, Jr., for "Calcium Sulfate as a Partial Replacement for Titanium Dioxide in White Compounds."

FIELD OF THE INVENTION

The invention relates to whitened polymeric blend compositions, and more specifically to sidewall packages having a reduced content of titanium dioxide.

BACKGROUND OF THE INVENTION

It has been customary in the past to make tire sidewalls using sidewall packages having a white polymeric blend composition. The polymeric blend composition is generally a blend of natural rubber, chlorobutyl, EPDM, and various other ingredients. A whitener having a high opacity, titanium dioxide, is generally added to mask the color of the blend composition. This further increases the brightness of the composition as well.

In the past, calcium sulfate has been added as a filler to such white polymeric blend compositions in addition to other additives, such as the whitener. Further, it has been known to use calcium sulfate as a white pigment in polystyrene resins used as paper coatings as is taught in U.S. Pat. No.3,873,521 to Tatsua et.al., or as a white pigment in a synthetic latex such as a diene derivative polymer used as a paper coating as taught in U.S. Pat. No. 4,425,452 to Nakata et.al. However, it has not been known that the titanium dioxide content could be reduced and replaced with a complementary amount of calcium sulfate.

Since the supply of titanium dioxide is sometimes less than the demand, it is an advantage to find a substitute for titanium dioxide as a whitener.

SUMMARY OF THE INVENTION

The invention relates to polymeric blend compositions using a whitener package comprising from about 0 to about 100 parts of titanium dioxide per hundred parts rubber, from about 0 to about 30 parts per hundred of calcium sulfate, and other pigments such as ultramarine blue, carbon black, or black pigment. In the whitening package from about 0 to about 20 parts per hundred of calcium sulfate acts as a substitute for the same amount by volume of titanium dioxide. The whitening package still achieves a brightness of at least 85 L value as measured on the Lab scale of a Minolta Chroma Meter test. The polymeric blend compositions are based on blends of natural rubber, halogenated isobutylene isoprene copolymer, ethylene propylene diene monomer, neoprene, polybutadiene, styrene butadiene, and/or hypalon. These blend compositions can be used to make white polymeric blend compositions or, alternatively, can be used in colored blend compositions which include titanium dioxide as a whitener. Such blend compositions are specifically used to make tire sidewall packages.

It is an advantage of the present invention to provide a whitening package having a reduced content of titanium dioxide while maintaining a suitable degree of whiteness.

It is a further advantage of the invention to provide a whitened polymeric blend composition and a sidewall package made therewith.

DETAILED DESCRIPTION OF THE INVENTION

The invention relates to a polymeric blend composition having a titanium dioxide whitening package with a reduced titanium dioxide content.

The whitening package comprises from about 0 to about 100 parts of titanium dioxide, and preferably from about 10 to about 60 parts, and most preferably from about 20 to about 40 parts per hundred of rubber. This package further contains from about 0 to about 30 parts of calcium sulfate, and preferably from about 0 to about 20; and most preferably from about 0 to about 10 parts per hundred parts rubber. The calcium sulfate acts as a substitute for titanium dioxide so that the amount of titanium dioxide can be reduced from the amount used in the prior art by up to 10 percent by volume. While the amount of titanium dioxide can be reduced, the whiteness values of the blend compositions are achieved as if the full amount of titanium dioxide were used. This whitener is at 85 L value; and preferably at least 86.5 L value; and most preferably at least 88 L value as measured by the light reflectance test and using the $L_{ab}$ scale of a Minolta Chroma Meter. The whitening package of the present invention can be used in "whitened rubber compounds". As used herein, "whitened rubber compounds" means either white rubber compounds or, alternatively, colored rubber compounds which utilize titanium dioxide to achieve their color.

The polymeric blend compositions of the present invention are comprised of blends of one or more of the following: natural or synthetic polyisoprene; halogenated isobutylene isoprene copolymer (this term is shortened in the industry to "butyl"), such as bromobutyl or chlorobutyl; ethylene propylene diene monomer; polybutadiene, either solution or emulsion; styrene-butadiene rubber; and/or chlorosulfonated polyethylene. These can be used in the proportions listed in Table I below.

TABLE I

|  | General | Preferred | Most Preferred |
|---|---|---|---|
| Natural or Synthetic Polyisoprene | 0–100 | 30–80 | 40–60 |
| Halogenated Butyl | 0–90 | 0–60 | 10–40 |
| Ethylene Propylene Diene Monomer | 0–50 | 0–30 | 0–20 |
| Neoprene | 0–60 | 0–40 | 0–20 |
| Polybutadiene | 0–50 | 0–40 | 0–30 |
| Styrene Butadiene Rubber | 0–50 | 0–40 | 0–30 |
| Hypalon | 0–80 | 0–50 | 0–20 |

Ranges are given in parts per hundred parts polymer. Specific preferred blends I through III are listed in Table II below.

TABLE II

|  | I | II | III |
|---|---|---|---|
| Natural or Synthetic Polyisoprene | 40–60 | 40–60 | 40–60 |
| Chloro-butyl | 30–50 | 40–60 | 40–60 |
| EPDM | 0–20 | — | — |
| Polybutadiene (either emulsion or solution) | — | 0–30 | — |
| Styrene Butadiene | — | — | 0–30 |

TABLE II-continued

|  | I | II | III |
|---|---|---|---|
| Rubber |  |  |  |

Ranges are given in parts per hundred parts polymer.

Other additives such as are known in the art which can be added include fillers and/or extenders including water washed clay, air floated clay, chemically treated clay, calcium carbonate and talc. Additional calcium sulfate can be used as filler so that the total calcium sulfate can be from 0 to 100 parts per hundred parts polymer, preferably from 0 to 60 parts and most preferably from about 0 to about 30 parts of calcium sulfate. Processing oils (either naphthenic or paraffinic) can be added.

Crosslinking agents and activators including zinc oxide, sulfurs, peroxides, fatty acids including stearic acid, maleic acid, palmitic acid, zinc chloride, and zinc stearate. Antidegradants including waxes, chemical antioxidants and chemical antiozonants can also be included. Additionally, as was mentioned with regard to the whitening package, pigments can be added, such as ultramarine blue, carbon black, or black pigment.

The blend compositions can be processed as follows: The polymer ingredients are charged into internal processing equipment including Banbury, Shaw, Skinner, Henschel mixers, or a mill such as a two-roll mill. Mixing occurs at from room temperature to about 350° F. with water jacket cooling during mixing. The compositions are sheeted off using a two-roll mill, dipped into an aqueous solution of clay or other antistick agents. The compositions are subsequently processed further through a side wall extruder or calender. The extrusion temperature is from 150° to 260° F. with water cooling after extrusion. The composition can be extruded into a side wall package as is known in the art. Methods of building such packages can include multiport head co-extrusion where contiguous strips of black, white or colored rubber are extruded at the same time, or alternatively the layers may be extruded from separate machines and can be aligned and joined at some point down line by appropriate machinery.

Whiteness is measured in the following examples using a Minolta Chroma Meter CR-100, which is a tristimulus color analyzer for measuring reflected subject color. The Chroma Meter utilizes high sensitivity silicon photocells filtered to match Commission Internationale de l'Eclairage Standard Observer Response. Readings are taken through the measuring head which is placed directly in contact with the sample to be measured. The readings are subsequently processed by the built-in microprocessor. Chromaticity is measured in $L_{ab}$.

For the following examples, the samples were prepared as uncured rubber sheets as follows. The compounds were prepared by banding on an open two-roll mill and subsequent sheeting off. These samples were not dipped again into any anti-stick agents. Ten readings were taken at random locations for each sample using the Minolta Chroma Meter CR-100. The readings were averaged and are given in Tables III, IV and V. Typically, standard deviations for L readings using this method is less than 0.5.

EXAMPLES

EXAMPLE 1

The samples listed in Table III were mixed on an open two-roll mill as follows:

The mill roll temperatures were initially brought to 100° F.

The polymers were continually passed between the mill rolls until a smooth, even band of blended rubber could be wrapped around the front roll of an open two-roll mill. The other fillers and pigments were slowly added to the rubber between the rolls until the material was incorporated into the rubber matrix. Any material which fell through the mill onto the pan below was added back to the mix. Once this was completed, the other processing aides were added to the blend in a similar fashion until uniformly mixed. Mixing temperatures were allowed to climb to about 220° F., assisted by steam or heated oil flowing inside the mill rolls.

Following the incorporation of all fillers, pigments, and processing aides, the vulcanizing agents, activators and accelerators were added to the blends. After these ingredients were incorporated, several cuts were made to the banded rubber in order to remove ½ to ¾ of the material. This material was then added directly on top of that remaining on the mill so as to insure adequate material blending.

After mixing was completed and a uniform material formed, the mixed compound was sheeted off and stored for later test requirements.

The whiteness values were measured as previously described and are listed in Table III. The data shows a decrease in whiteness of less than 0.5 percent, although the titanium dioxide was reduced by over 16 percent.

EXAMPLE 2

Samples C through F were mixed having the same general recipe and using the same technique as Sample A from Example I except that the levels of titanium dioxide and calcium sulfate were varied as noted in Table IV. Whiteness values are listed in Table IV. The data shows an increase in whiteness of 0.4 percent and 1.5 percent, respectively, for the samples made in accordance with the invention.

EXAMPLE 3

Samples G through J were mixed having the same general recipe and using the same technique as Sample A from Example I except that the levels of titanium dioxide and calcium sulfate were varied as noted in Table V. Whiteness values are listed in Table V. The samples in accordance with the invention demonstrate a 0.2 percent increase, and at much higher whitener levels a 1.0 percent decrease in whiteness values as compared to the control.

TABLE III

|  | Sample A | Sample B |
|---|---|---|
| TiO$_2$* | 100 | 83 |
| Calcium Sulfate* | — | 22 |
| Whiteness |  |  |
| L Max | 86.06 | 85.61 |
| Min | 85.82 | 85.41 |
| Mean | 85.95 | 85.55 |
| a Max | −1.86 | −1.54 |
| Min | −1.46 | −1.73 |
| Mean | −1.39 | −1.65 |
| b Max | 0.13 | 0.34 |
| Min | −0.04 | 0.11 |

TABLE III-continued

| | Sample A | Sample B |
|---|---|---|
| Mean | 0.04 | 0.25 |

*The values are indexed to the amount of titanium dioxide added and replacement is based on equal volume. Numbers given are in weight percentage.

TABLE IV

| SAMPLE | Compound C | Compound D | Compound E | Compound F |
|---|---|---|---|---|
| Fillers | | | | |
| TiO$_2$* | 100 | 75 | 100 | 90 |
| CaSO$_4$* | — | 19 | — | 8 |
| Whiteness | | | | |
| L Max | 86.13 | 86.38 | 85.17 | 86.30 |
| Min | 85.74 | 85.74 | 84.50 | 85.95 |
| Mean | 85.91 | 86.24 | 84.88 | 86.14 |
| a Max | −1.20 | −1.14 | −1.60 | −1.32 |
| Min | −1.34 | −1.29 | −1.70 | −1.50 |
| Mean | −1.27 | −1.26 | −1.64 | −1.45 |
| b Max | 1.09 | 1.52 | 1.01 | 2.05 |
| Min | .93 | 1.25 | .67 | 1.61 |
| Mean | 1.02 | 1.25 | .85 | 1.83 |

*The values are indexed to the amount of titanium dioxide added and replacement is based on equal volume. Numbers given are in weight percentage.

TABLE V

| SAMPLE | Compound G | Compound H | Compound I | Compound J |
|---|---|---|---|---|
| Fillers | | | | |
| TiO$_2$* | 100 | 75 | 175 | 121 |
| CaSO$_4$* | — | 19 | — | 38 |
| *Brightness L | 85.91 | 86.04 | 87.24 | 86.39 |

*The values are indexed to the amount of TiO$_2$ in Compound G as representing 100 index value. The calcium sulfate values are indexed accordingly as represented in Tables III and IV.

While in accordance with the Patent Statutes, the best mode and preferred embodiment has been set forth, the scope of the invention is not limited thereto, but rather by the scope of the attached claims.

What is claimed is:

1. A whitened rubber compound, comprising:
   a blend of one or more polymers chosen from the group consisting of natural or synthetic polyisoprene, halogenated isobutylene isoprene copolymer, rubber made from ethylene propylene diene monomer, polybutadiene, and styrene butadiene, rubber; and
   a whitening package comprising from about 10 to about 60 parts of titanium dioxide per hundred parts rubber and a replacement for a quantity of titanium dioxide comprising an equal quantity by volume of calcium sulfate, said quantity of calcium sulfate being up to about 20 parts per hundred parts rubber, whereby said whitened rubber compound has a brightness of at least 85 L Value as measured on the Lab scale of a Minolta Choma Meter.

2. A whitened rubber compound as set forth in claim 1 comprising:
   from about 0 to about 100 parts natural or synthetic polyisoprene; from about 0 to about 90 parts halogenated isobutylene isoprene copolymer; from about 0 to about 50 parts ethylene propylene diene monomer; from about 0 to about 60 parts neoprene; from about 0 to about 50 parts polybutadiene; from about 0 to about 50 parts styrene butadiene rubber; and from about 0 to about 80 parts chlorosulfonated polyethylene, all parts per 100 parts rubber.

3. A whitened rubber compound as set forth in claim 1 comprising:
   from about 30 to about 80 parts natural or synthetic polyisoprene; from about 0 to about 60 parts halogenated isobutylene isoprene copolymer; from about 0 to about 30 parts ethylene propylene diene monomer; from about 0 to about 40 parts neoprene; from about 0 to about 40 parts polybutadiene; from about 0 to about 40 parts styrene butadiene rubber; and from about 0 to about 50 parts chlorosulfonated polyethylene.

4. A whitened rubber compound as set forth in claim 3 comprising:
   from about 10 to about 60 parts natural or synthetic polyisoprene; from about 10 to about 40 parts halogenated isobutylene isoprene copolymer; from about 0 to about 20 parts ethylene propylene diene monomer; from about 0 to about 20 parts neoprene; from about 0 to about 30 parts polybutadiene; from about 0 to about 30 parts styrene butadiene rubber; and from about 0 to about 20 parts chlorosulfonated polyethylene.

* * * * *